(12) United States Patent
Joung et al.

(10) Patent No.: US 8,161,382 B2
(45) Date of Patent: Apr. 17, 2012

(54) METHOD FOR PROVIDING FONT SERVICE ON SERVICE PAGE AND SYSTEM FOR EXECUTING THE METHOD

(75) Inventors: Eun Ju Joung, Seoul (KR); Tae Heon Lee, Seoul (KR)

(73) Assignee: NHN Corporation, Seongnam-si (KR)

( * ) Notice: Subject to any disclaimer, the term of this patent is extended or adjusted under 35 U.S.C. 154(b) by 1114 days.

(21) Appl. No.: 11/719,948

(22) PCT Filed: Nov. 24, 2005

(86) PCT No.: PCT/KR2005/003981
§ 371 (c)(1),
(2), (4) Date: May 22, 2007

(87) PCT Pub. No.: WO2006/057517
PCT Pub. Date: Jun. 1, 2006

(65) Prior Publication Data
US 2009/0100074 A1    Apr. 16, 2009

(30) Foreign Application Priority Data
Nov. 24, 2004    (KR) .................. 10-2004-0096768

(51) Int. Cl.
*G06F 17/00* (2006.01)
(52) U.S. Cl. ........................ 715/269; 715/243
(58) Field of Classification Search .................. 715/200, 715/243, 255, 269
See application file for complete search history.

(56) References Cited

U.S. PATENT DOCUMENTS
5,533,174 A * 7/1996 Flowers et al. .............. 358/1.15
(Continued)

FOREIGN PATENT DOCUMENTS
JP    H08-030587    2/1996
(Continued)

OTHER PUBLICATIONS

Convenient Functions! Mastering the convenient functions! Using Windows XP #05 skillfully; Jan. 8, 2003, pp. 180-181, JP.

*Primary Examiner* — Stephen Hong
*Assistant Examiner* — Manglesh Patel
(74) *Attorney, Agent, or Firm* — H.C. Park & Associates, PLC

(57) ABSTRACT

Provided is a method of providing font services by using an item server and a service server, including: the item server maintaining font providing information including font information and area information associated with the font information, for each user in a user database; the service server maintaining service page database including text associated with each area of the service page associated with the user; the service server receiving the font providing information associated with the user from the item server; generating the service page in which a text image, corresponding to the text associated with a certain area of the service page and generated according to the font information associated with the certain area, is displayed in the certain area, based on the received font providing information; and providing the generated service page by transmitting to a user terminal.

15 Claims, 15 Drawing Sheets

| USER IDENTIFIER | AREA INFORMATION | FONT INFORMATION | ... |
|---|---|---|---|
| WISJJANG | POST | TAHOMA | |
| | COMMENT | BASIC TYPEFACE | |
| | TRACKBACK | ... | |
| | ... | ... | |
| KKUE | POST | TIMES NEW ROMAN | ... |

1201

U.S. PATENT DOCUMENTS

| | | | |
|---|---|---|---|
| 6,012,071 A * | 1/2000 | Krishna et al. | 715/201 |
| 6,073,147 A * | 6/2000 | Chan et al. | 715/234 |
| 6,073,148 A * | 6/2000 | Rowe et al. | 715/205 |
| 6,203,220 B1 * | 3/2001 | Takenoshita et al. | 400/61 |
| 6,320,587 B1 * | 11/2001 | Funyu | 345/467 |
| 6,901,427 B2 * | 5/2005 | Teshima | 709/203 |
| 7,010,587 B1 * | 3/2006 | Shiimori | 709/223 |
| 2002/0010725 A1 * | 1/2002 | Mo | 707/530 |
| 2002/0194261 A1 * | 12/2002 | Teshima | 709/203 |

FOREIGN PATENT DOCUMENTS

| | | |
|---|---|---|
| JP | H09-223062 | 8/1996 |
| JP | 2001-142905 | 5/2001 |
| JP | 2002-342242 | 11/2002 |
| KR | 10-2000-0036730 | 7/2000 |
| KR | 10-2002-0004093 | 1/2002 |
| KR | 10-2002-0014039 | 2/2002 |
| KR | 10-2003-0022842 | 3/2003 |

* cited by examiner

FIG. 4

| Font sample | Font name | |
|---|---|---|
| 가나다라마바 ABCDEFGHI abcdefghi | MINGLIU | [BUYING>] [GIFT>] |
| 가나다라마바 ABCDEFGHI abcdefghi | CENTAUR | [BUYING>] [GIFT>] — 401 |
| 가나다라마바 ABCDEFGHI abcdefghi | MS GOTHIC | [BUYING>] [GIFT>] |
| 가나다라마바 ABCDEFGHI abcdefghi | CENTURY | [BUYING>] [GIFT>] |
| 가나다라마바 ABCDEFGHI abcdefghi | ELEPHANT | [BUYING>] [GIFT>] |
| 가나다라마바 ABCDEFGHI abcdefghi | MS MINCHO | [BUYING>] [GIFT>] |
| 가나다라마바 ABCDEFGHI abcdefghi | ERAS BOLD ITC | [BUYING>] [GIFT>] — 402 |
| 가나다라마바 ABCDEFGHI abcdefghi | LUCIDA FAX | [BUYING>] [GIFT>] |
| 가나다라마바 ABCDEFGHI abcdefghi | CALISTO MT | [BUYING>] [GIFT>] |
| ✦✦✦✦✦✦ ABCDEFGHI abcdefghi | ARIAL | [BUYING>] [GIFT>] |
| 가나다라마바 ABCDEFGHI abcdefghi | ARIAL BLACK | [BUYING>] [GIFT>] |
| 가나다라마바 ABCDEFGHI abcdefghi | NSIMSUN | [BUYING>] [GIFT>] |

FIG. 5

| USER IDENTIFIER | FONT ITEM IDENTIFIER | TIME LIMIT |
|---|---|---|
| WISJJANG | TAHOMA | 2004.01.01 ~ 2004.12.31 |
| | STYLUS BT | 2004.11.01 ~ 2004.11.30 |
| KKUE | TIMES NEW ROMAN | 2004.12. |
| POSSE | ... | ... |

FIG. 10

| SERVICE PAGE IDENTIFIER | USER IDENTIFIER | AREA INFORMATION | TEXT INFORMATION |
|---|---|---|---|
| HTTP://BLOG.NAVER.COM/SOLEIL05.DO | WISJJANG | SERVICE PAGE TITLE | THE DAY COMICS RULE THE WORLD |
| | | SELF-INTRODUCTION | HOW CUTE! |
| | | CATEGORY | CARTOONIST/ DETECTIVE CONAN/ ONE PIECE/ |
| | | ... | ... |
| ... | KKUE | SERVICE PAGE TITLE | |

METHOD FOR PROVIDING FONT SERVICE ON SERVICE PAGE AND SYSTEM FOR EXECUTING THE METHOD

CROSS REFERENCE TO RELATED APPLICATIONS

This application is a U.S. National Phase Application of International Application PCT Application No. PCT/KR2005/003981 filed on Nov. 24, 2005, which claims the benefit of priority from Korean Patent Application No. 10-2004-0096768 filed on Nov. 24 2004. The disclosures of International Application PCT Application No. PCT/KR2005/003981and Korean Patent Application No. 10-2004-0096768 are incorporated herein by reference.

TECHNICAL FIELD

The present invention relates to a method of displaying a letter of a font established by a user for each area in a service page and a system for executing the method.

BACKGROUND ART

Internet users frequently communicate with other users by using a personal community space such as a homepage or blog, or a public community space in which a plurality of users may easily access, such as a group community space or a discussion space coupled with a news board.

At the same time, Internet users try to beautifully decorate a space as requested by users of the personal community space or public community space. For this, a service of providing a skin or background music for each service page is provided. Accordingly, an Internet user may decorate a background scene with a skin and play background music.

As another method of decorating a personal community space, there is a method of displaying text inputted by a user in a predetermined font. For example, the Internet user may use a font service of displaying text inputted into a personal community space of the Internet user, in "Arial".

However, in a conventional font service, an Internet user purchases a font item and request application. As illustrated in FIG. 1, a letter displayed in the personal community space of the Internet user is shown in an existing font before applying the font item (refer to reference numeral 101) or shown in one font according to the font item applied by request (refer to reference numeral 102). Accordingly, in the conventional art, there is a problem that a personal community space of the user cannot be decorated by applying various fonts at the same time.

Also, in a conventional font service, a user just enables a letter to be shown in a predetermined font by using a font item that the user has purchased, for a personal community space of the user. The user cannot use the font item in a personal community space of others or a public community space, thereby limiting the range of use of a font item.

DISCLOSURE OF INVENTION

Technical Goals

The present invention provides a method of providing font service and a system performing the method, in which a service page is divided into a plurality of areas and where a user may establish for each area a letter font displayed in each area.

The present invention also provides a method of providing font service and a system performing the method, in which when a second user that is not a first user having authority with respect to a service page, the first user a so-called master of the service page, inputs text in a certain area of the service page, the text is not displayed as is but the text is converted to a font established by the second user with respect to the certain area.

Technical Solutions

According to an aspect of the present invention, there is provided a method of providing font services by using an item server and a service server, including: the item server maintaining font providing information including font information and area information associated with the font information, for each user in a user database, wherein the area information identifies each area of a service page divided into a plurality of areas; the service server maintaining service page database including text associated with each area of the service page associated with the user; the service server receiving the font providing information associated with the user from the item server; generating the service page in which a text image, corresponding to the text associated with a certain area of the service page and generated according to the font information associated with the certain area, is displayed in the certain area, based on the received font providing information; and providing the generated service page by transmitting to a user terminal.

According to another aspect of the present invention, there is provided a method of providing font services by using an item server and a service server, including: the item server maintaining font providing information including font information and area information associated with the font information, for each user, in a user database, wherein the area information identifies each area of a service page divided into a plurality of areas; in the case a first user accesses a service page associated with a second user and inputs text with respect to a certain area of the service page, receiving the font information associated with the first user and the certain area from the item server; the service server generating the service page in which a text image, corresponding to the inputted text and generated according to the font information, is displayed in the certain area by using the received font information; and providing the generated service page to the first user.

BRIEF DESCRIPTION OF DRAWINGS

FIG. 4 is a diagram illustrating an example of a font shop page including a user interface from which users purchase a font item, in an embodiment of the present invention;

FIG. 5 is a diagram illustrating an example of data stored in a first database of an item server according to the present invention;

FIG. 10 is a diagram illustrating an example of data stored in a service page database of the service server according to the present invention;

BEST MODE FOR CARRYING OUT THE INVENTION

Hereinafter, the present invention will be described in detail with reference to the attached drawings.

Figure 1:
FIG. 1 is a diagram illustrating an example of a service page generated by a conventional technology.
Figure 2:
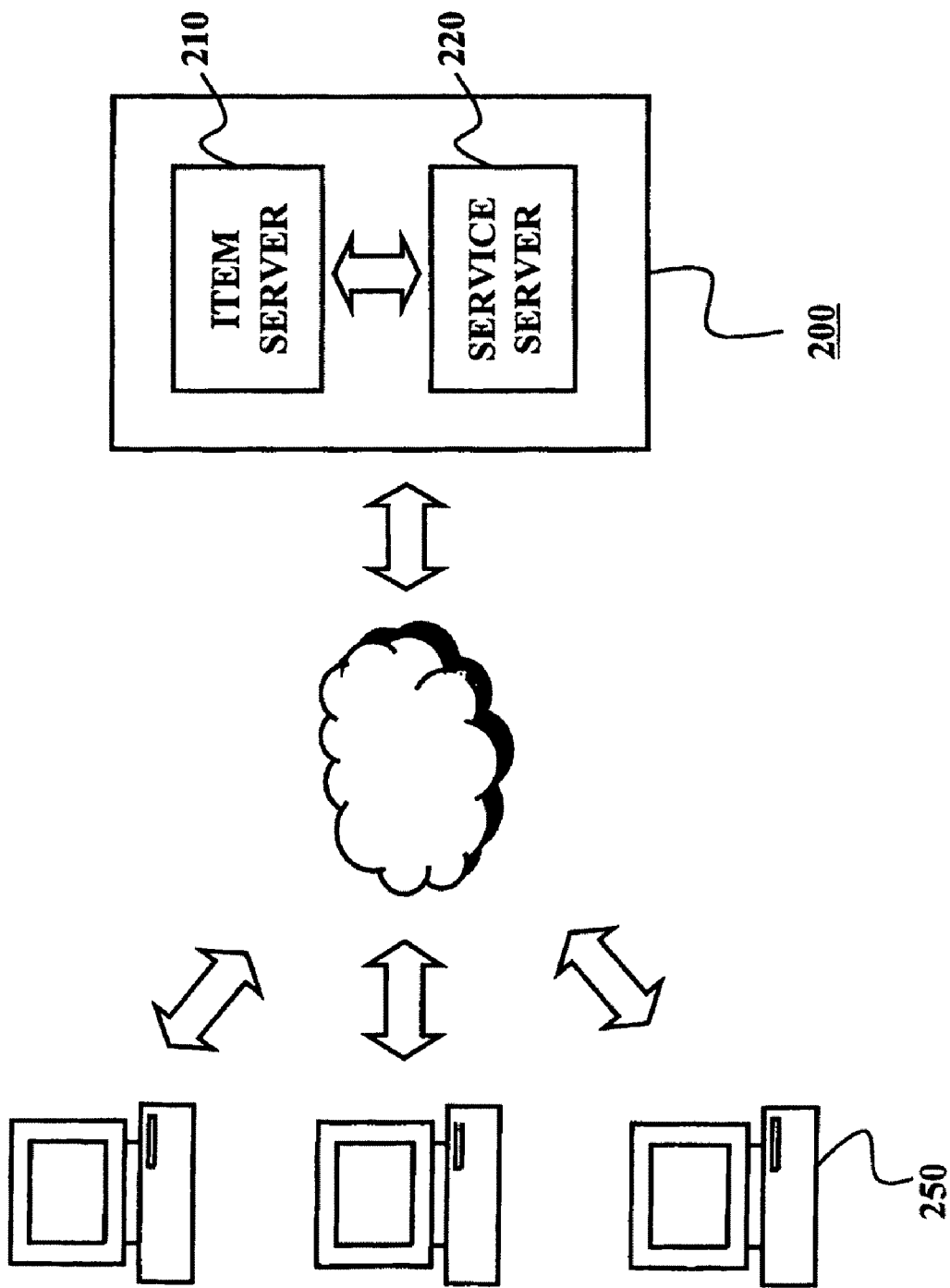
FIG. 2 is a diagram illustrating network connection of a font service providing system according to an embodiment of the present invention.

FIG. 2 is a diagram illustrating network connection of a font service providing system 200 according to an embodiment of the present invention.

The font service providing system 200 may be connected to a plurality of user terminals 250 via a wired/wireless communication network. Also, the font service providing system 200 includes an item server 210 and a service server 220.

The user terminal 250 is a communication terminal that can access the font service providing system 200 via a wired/wireless communication network, which commonly designates a communication terminal that can access a search system via a wired/wireless Internet by including a predetermined communication module such as a Code Division Multiplexing Access (CDMA) module, a Bluetooth module, an infrared data association (IrDA) module, and a wired/wireless LAN card, such as those included in a personal digital assistant (PDA), a smart phone, a handheld PC, and a mobile phone.

Figure 3:
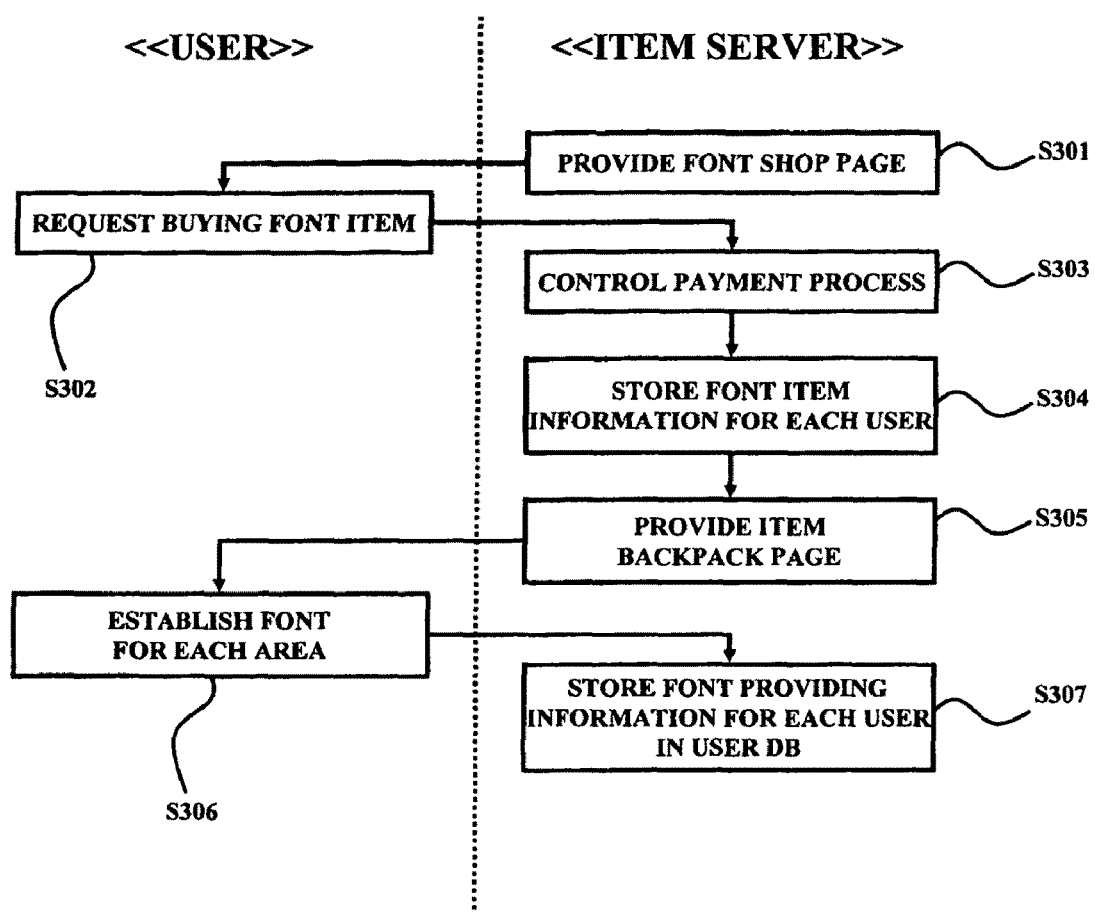
FIG. 3 is a flowchart illustrating a font service providing method according to an embodiment of the present invention.
Figure 9:
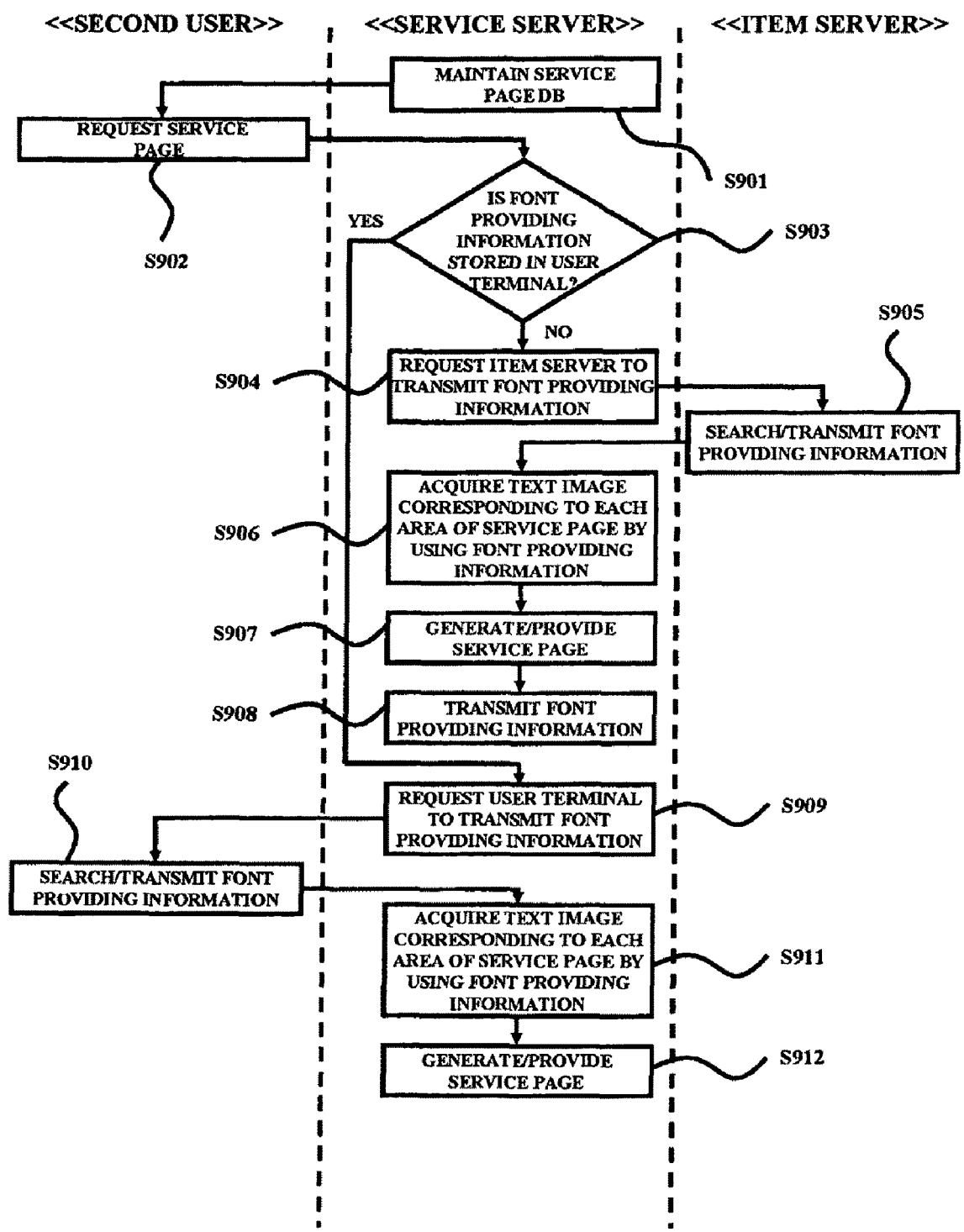
FIG. 9 is a flowchart illustrating a font service providing method according to another embodiment of the present invention.

FIGS. 3 and 9 are flowcharts illustrating a font service providing method according to an embodiment of the present invention. In the font service providing method according to the present embodiment, the service server 220 provides a service page that is one of various types of personal community spaces.

A process of purchasing a font item and a process of establishing a font for each area by using the font item will be described with reference to FIGS. 3 and 4.

In S301, the item server 210 provides a font shop page including a user interface, where users can purchase a font item as shown in FIG. 4, to the users. In S302, the user accessing the font shop page may purchase and secure a font item of a predetermined font. Also, the user may secure a font item bought by another user or a font item provided according to a predetermined event such as "receiving a gift". The item server 210 may control the provision of a payment service, for paying for a font item, to a user selecting the font item by clicking a buying button 401 or a gift button 402.

In S304, the item server 210 stores information on font items acquired by purchasing or receiving a gift in a first user database, for each user.

Additionally, in the case there is a time limit on using the font item, the item server 210 may further store time limit information in association with the user and the font item. The time limit information is a time limit in which the font item may be used. After the time limit passes, if the font item is not purchased by the user, the font item may no longer be used. Cost for the font item may vary according to the time limit.

Also, according to embodiments, the time limit may be relatively established such as "30 days past the purchase date of a font item" and may be absolutely established as "from Jan. 1, 2004 to Dec. 31, 2004", according to the selection of the user.

FIG. 5 is a diagram illustrating an example of data stored in the first user database. Referring to FIG. 5, a user "wisjjang" purchases font items to use Tahoma typeface and Stylus BT typeface, respectively. The Tahoma typeface may be used for a year, from Jan. 1, 2004 to Dec. 31, 2004. The Stylus BT typeface may be used for 30 days, from Nov. 1, 2004 to Nov. 30, 2004.

Also, in S305, the item server 210 provides an item backpack page including a user interface, in which the user may establish a font for each area by using a font item, to the user. The item backpack page is individually generated for each user with reference to the first user database. In the case a personal community space provided by the service server is divided into a plurality of areas, the item server 210 enables the user to establish a font for each area.

Figure 6:
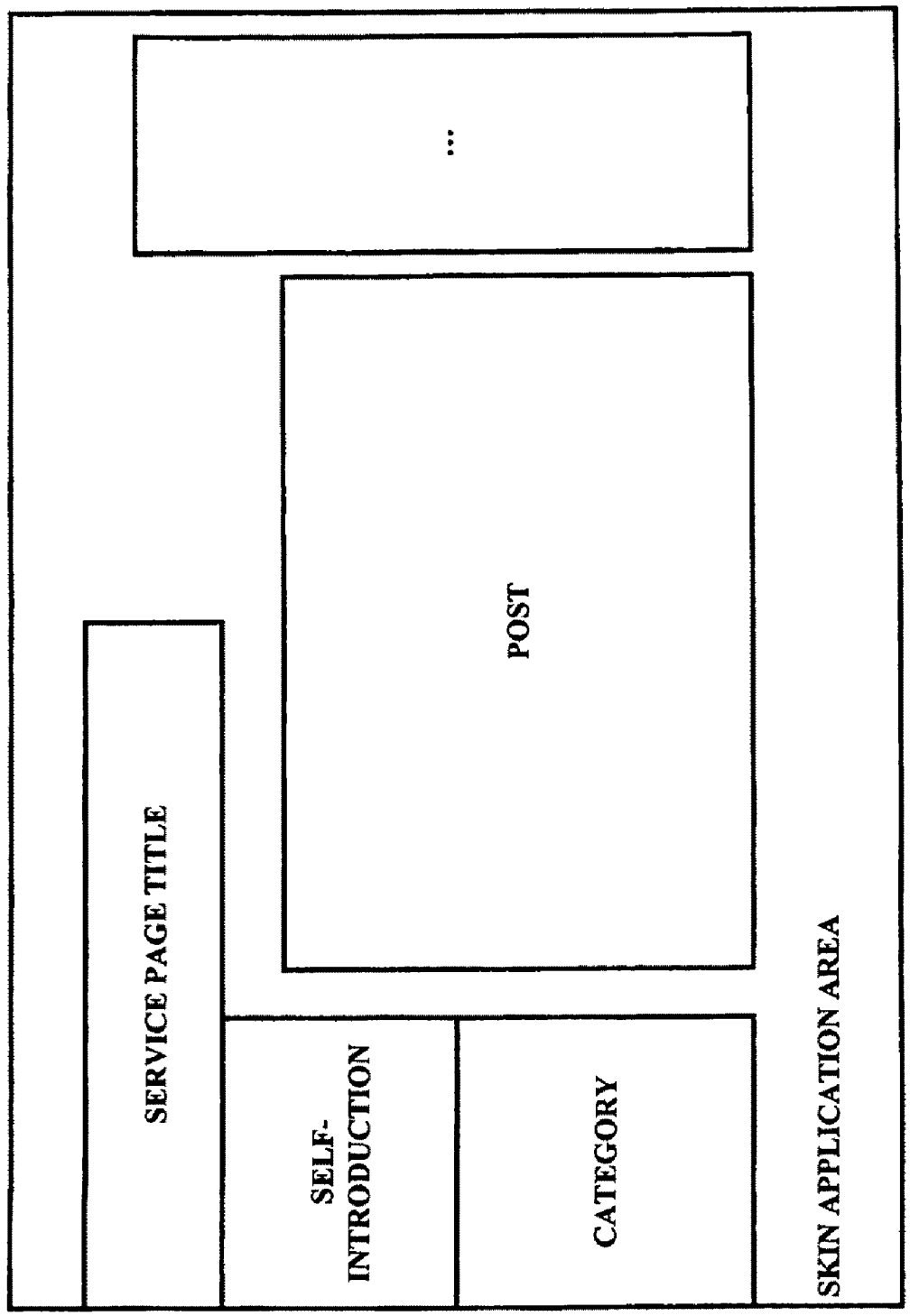
FIG. 6 is a diagram illustrating an example of dividing a service page provided by a service server according to the present invention into a plurality of areas such as a service page title area and a self-introduction area.

FIG. 6 is a diagram illustrating an example of dividing the service page provided by the service server into a plurality of areas such as a service page title area and a self-introduction area. Also, FIG. 7 is a diagram illustrating an example of an item backpack page associated with the user "wisjjang", from the item backpack pages provided by the item server.

Figure 7:
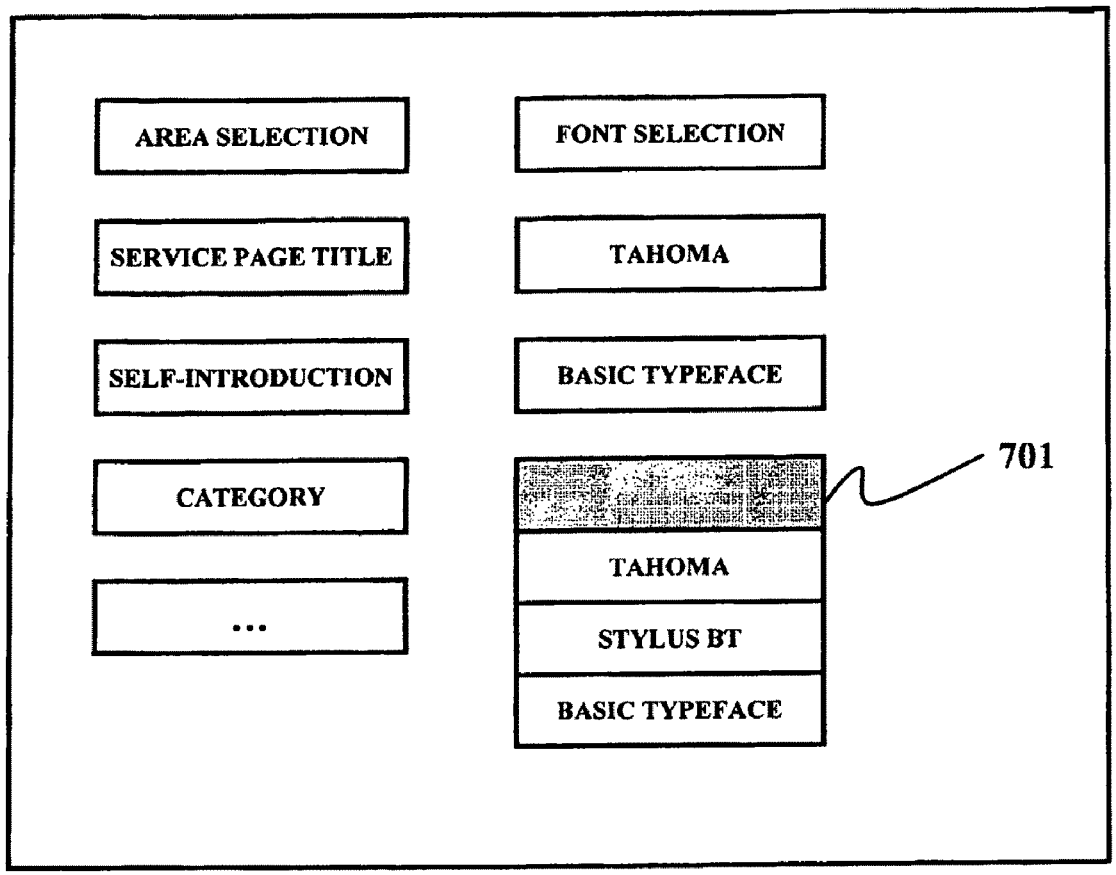
FIG. 7 is a diagram illustrating an example of an item backpack page provided by the item server according to the present invention.

Referring to FIG. 5, since the fonts which can be used by the user "wisjjang" are Tahoma typeface and Stylus BT typeface, as displayed as reference numeral 701 of FIG. 7, the item server 210 may provide a user interface for establishing a font to be applied, from Tahoma typeface, Stylus BT typeface, or basic typefaces provided.

Also, in the present invention, a letter font displayed in a relevant area may be established in the item backpack page, and a size or color of the letter may be established in a relevant blog by using a basic editing function provided by the service server 220.

Also, according to another embodiment of the present invention, the item server 210 may enable the size or color of the letter displayed in the relevant area to be established in the item backpack page.

In the present specification, as described above, information on a font selected by the user is designated as font information, information for identifying each area of a service page is designated as area information, and information including font information and area information associated with the font information is designated as font providing information.

Figure 8:
FIG. 8 is a diagram illustrating an example of data stored in a second user database of the item server according to the present invention.

In the case the user "wisjjang" establishes a font for each area of the service page in the item backpack information in S306, the item server 210 stores font providing information including font information and area information in association with the user "wisjjang" in a second user database in S307. FIG. 8 is a diagram illustrating an example of data stored in the second user database. Referring to the second user database, a font of letters for each corresponding area of the service page of the user "wisjjang" may be determined.

As another example, in the case of font information registered by using a font item having an established time limit as illustrated in FIG. 5, if the time limit of the font item has passed, the item server 210 may update the second user database in order to change a corresponding font into a basic typeface. Namely, referring to FIG. 5, since the Tahoma typeface can be used until Dec. 31, 2004, if the user does not purchase the relevant font item again, from 0 o'clock Jan. 1, 2005, font information 801, shown in FIG. 8, of the second user database may be changed into "basic typeface". Accordingly, from 0 o'clock Jan. 1, 2005, letters in a service page title area of the service page of the user "wisjjang" are displayed in the basic typeface.

As described above, a process in which a user establishes font information for each area of a service page that is a personal community space of the user has been described.

Hereinafter, referring to FIG. 9, in the case users request a predetermined service page, the service server 220 acquiring the font providing information and generating the service page will be described.

In S901, the service server 220 maintains a service page database including text included in the service page for each area. For example, in the service page database, data shown in FIG. 10 may be stored in association with the service page of the user "wisjjang". Also, in the service page database, additional information for generating a predetermined service page, for example, position information on an image path or a position of contents, may be further included.

In the case a user requests the service page of the user "wisjjang" in S902, the service server 220 requests item server 210 to provide the font providing information associated with the service page of the user "wisjjang" in S904. The user may request providing the service page of the user "wisjjang" via a link or by directly inputting a network address of the service page of the user "wisjang". The user may be the same person as the user "wisjjang" or a different person.

In S905, in the case of the request, as illustrated in FIG. 8, the item server 210 searches the font providing information associated with the user "wisjjang" by referring to the second user database and transmits to the service server 220.

Accordingly, the service server 220 may establish a font of the letters included in each of the areas of the service page of the user "wisjjang", based on the font providing information. For example, in the service page title area of the service page, letters of "the day comics rule the world" will be displayed in Tahoma.

The service server 220 may directly generate a text image such as a bitmap format or an image defined by an outline type, corresponding to the text "the day comics rule the world" by using the font providing information.

Also, the service server 220 may acquire the text image by transmitting the font providing information and text associated with each area of the service page to an additional image server (not shown), for each area. For example, the service server 220 transmits font information associated with the service page title area and text associated with the service page title area to the image server, respectively. The image server converts the transmitted text into a text image matching the font information, and transmits the text image to the service server 220. Accordingly, the service server 220 may acquire the text image corresponding to the text of the area.

However, the present invention relates to a configuration of establishing a letter font displayed in a predetermined area of a service page by using font providing information, and the scope of the present invention is not limited by an individual method of acquiring a text image corresponding to a predetermined text by using font providing information.

In S907, the service server 220 generates and provides to the user, a service page displaying the acquired text image in a relevant area.

On the other hand, according to another embodiment of the present invention, the service server 220 may receive the font providing information from a user terminal 250 instead of the item server 210. According to the present embodiment, in the case the user requests the service page of the user "wisjjang" in S902, the service server 220 determines whether the font providing information associated with the user "wisjjang" is stored in the user terminal 250 of the user in S903.

In the case the font providing information is not stored in the user terminal 250, the service server 220 receives the font providing information from the item server 210 in S904 and S905. Also, in the case the font providing information is not stored in the user terminal 250, the service server 220 transmits the font providing information received from the item server 210 to the user terminal 250 to store the font providing information in association with the user "wisjjang" or the service page of the user "wisjjang", in the user terminal 250.

Accordingly, according to the present embodiment, once the user terminal 250 receives a predetermined service page, font providing information associated with the service page is stored.

In the case the font providing information is stored in the user terminal 250, the service server 220 requests the user terminal 250 to transmit the font providing information in S909 and receives the font providing information from the user terminal 250 in S910. Also, similar to S906 and S907, the service server 220 generates the service page of the user "wisjjang" by using the font providing information received from the user terminal 250, and provides the service page to the user in S911 and S912.

On the other hand, in the case the font providing information associated with the user "wisjjang" is not stored in the user terminal 250, after S904 through S908 are performed, the font providing information becomes stored in the user terminal 250. Accordingly, in the case the user requests the service page again, the service server 220 performs S909 through S912 and generates the service page by using the font providing information stored in the user terminal 250.

Also, 1) as described above, in the case a time limit on a font item is established and the font item can not be used because the time limit has passed, and 2) in the case the font providing information associated with the user "wisjjang" is updated as the user "wisjjang" changes a font applied in each area of the service page in the item backpack page, the item server 210 transmits a notice on the relevant condition described above to the service server 220. In the case the service server 220 receives a notice, though the font providing information associated with the user "wisjjang" is stored in the user terminal 250, the service server 220 receives the updated font providing information from the item server 210 and generates the service page of the user "wisjjang". Also, the service server 220 transmits the updated font providing information to the user terminal 250 such that the updated font providing information is stored instead of the existing font providing information.

According to the described configuration, the user "wisjjang" designates a preferred font for each area of the service page to display a letter in a relevant font, thereby more beautifully decorating the service page.

Figure 11:
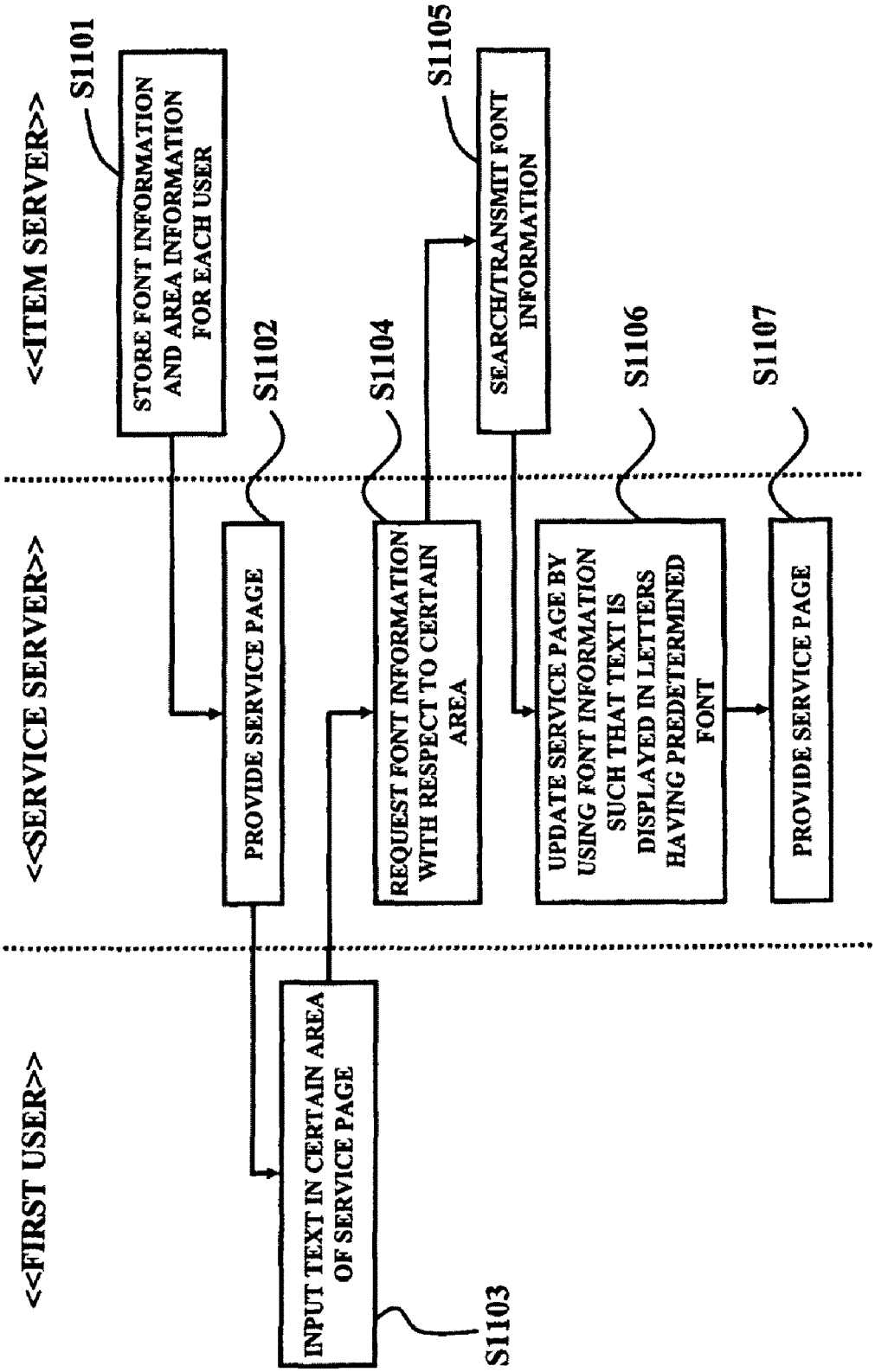
FIG. 11 is a flowchart illustrating a font service providing method according to still another embodiment of the present invention.

Hereinafter, a font service providing method according to another embodiment of the present invention will be described with reference to FIG. 11. In the font service providing method according to the present embodiment, the service server 220 provides a service page that is one of personal community space and a public community space. Particularly, according to the present embodiment, the user may establish not only a letter font displayed in a service page of the user but also a letter font inputted by the user in a service page of other users or a certain area of a service page of the public community space.

Figure 12:
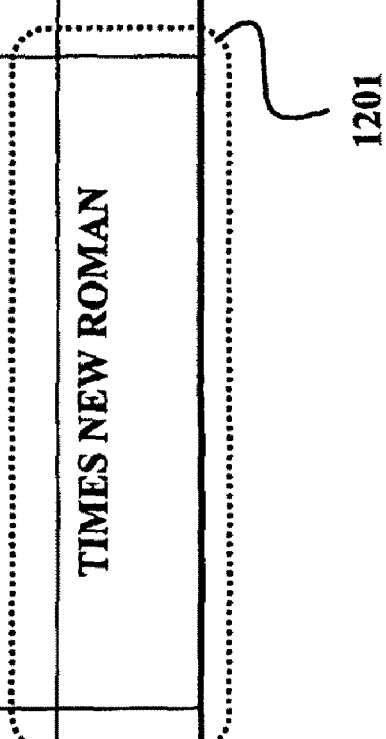
FIG. 12 is a diagram illustrating an example of data stored in a third user database of the item server according to the present invention.

Similar to the configuration described with reference to FIG. 3, the item server 210 stores font information and area information associated with the font information in a third user database in S1101. Different from the described embodiment, the area information stored in the third user database is information on an area in which the user can input contents such as text and put the contents on a board of the service page divided into a plurality of areas. Accordingly, the area information may be information on an area into which the user inputs the contents, such as a post, comment, and TrackBack. FIG. 12 is a diagram illustrating an example of the third user database.

In S1102, the service server 220 generates and provides to the first user a predetermined service page according to an access request of a first user.

In S1103, the first user received the service page inputs contents to the service server 220, with respect to a certain area in which the first user can register the contents from the service page, for example, a post area.

In S1104, in the case text is included in the inputted contents, the service server 220 requests the item server 210 to transmit font information associated with the second user and the certain area.

In S1105, the item server 210 receiving the request retrieves and transmits to the service server 220 the font information associated with the second user and the certain area. For example, referring to FIG. 12, in the case a user identifier of the second user is "kkue", the item server 210 retrieves and transmits to the service server 220 font information 1201 associated with the post area and the second user.

In S1106 and S1107, the service server receiving the font information 1201 from the item server 210 updates and provides to the second user the service page to display the text inputted by the second user in Times New Roman typeface.

Accordingly, in the case the second user registers contents in not only the service page of the second user but also a service page of others or a predetermined area of a service page of a public community space, the second user may enable the text included in the contents to be displayed in a font established by designating an area by the second user. The letter may be a text image defined by a bitmap format or outline type.

Accordingly, in the case a plurality of users register contents, since letters in various fonts are displayed in a single area such as a post area, the service page becomes increasingly multiform and the users are satisfied with beautifully decorating the contents of the users.

As described above, the method of establishing a font displayed in each area of a service page of a user's own, which is a personal community space, and the method of establishing a font of text inputted by a user in the user's own personal community space or a certain area of a public community space are described, respectively. The two methods may be not only independently performed but also performed in parallel or coupled with each other, with respect to a predetermined service page.

Namely, in a font service providing method according to another embodiment of the present invention, with respect to the service page of the user "wisjjang", letters may be displayed in a font established by the user "wisjjang" in areas of a title of the service page, self-introduction, simultaneously displaying text in a font established by a user "kkue" with respect to a post area in the case the user "kkue" visiting the service page of the user "wisjang" inputs the text in the post area of the service page.

Also, the embodiments of the present invention include a computer readable medium including a program instruction for executing various operations realized by a computer. The computer readable medium may include a program instruction, a data file, and a data structure, separately or cooperatively. The program instructions and the media may be those specially designed and constructed for the purposes of the present invention, or they may be of the kind well known and available to those skilled in the art of computer software arts.

Hereinafter, a font service providing system 1300 according to another embodiment of the present invention will be described with reference to FIG. 13. The font service providing system 1300 includes a user database 1301, a service page database 1302, a user input unit 1303, a search unit 1304, a service page generation unit 1305, and a service page providing unit 1306.

As illustrated in FIG. 8, the user database 1301 maintains font providing information including font information and area information associated with the font information, for each user. The area information is information for identifying each area of a service page divided into a plurality of areas. The font information is information for determining a letter font displayed in the area identified by the area information.

Users may establish a letter font displayed in a certain area of a user's own service page by using a font item secured by user purchase or receiving as a gift and may register in the user database 1301.

The service page database 1302 includes text associated with each area of a service page associated with a user, for each user. Accordingly, referring to the service page database 1302, a letter font displayed in a certain area of a service page of each user may be determined.

In the case a first user requests a service page associated with a second user by using a user terminal 1350, the user input unit 1303 receives the request. The first user may be the same as the second user.

In the case the above request is received, the search unit 1304 searches font providing information associated with the second user with reference to the user database 1301.

The service page generation unit 1305 generates the service page based on the retrieved font providing information such that a text image, corresponding to text associated with a certain area of the service page and generated font information associated with the certain area, is displayed in the certain area. The retrieved font providing information may be information for indicating in what font the text associated with the certain area is to be displayed in.

The service page generation unit 1305 may generate the text image by including a text image matching font information for each letter and selecting a text image corresponding to the text and matching the font information.

Also, the service page generation unit 1305 may generate the text image by transmitting the text and the font information to an additional image server, so that the text image is generated, and receiving the text image from the image server. Also, the scope of the present invention, including the case of generating a text image by using font information established for each area, is not limited by an individual method of generating a text image by using the font information, and may use a known text image generation method. For example, the service page generation unit 1305 may enable the text image to be generated by a web font type.

The service page providing unit 1306 provides the generated service page by transmitting the generated service page to the first user.

Hereinafter, referring to FIG. 14, a font service providing system 1400 according to another embodiment of the present invention will be described. The font service providing system 1400 includes a user database 1401, a search unit 1402, a service page generation unit 1403, and a service page providing unit 1404.

The user database 1401 maintains font providing information including font information and area information associated with the font information, for each user. Identical to the described embodiments, the area information is information for identifying each area of a service page divided into a plurality of areas, and the font information is information for determining a letter font displayed in a relevant area.

In the case a first user accesses a predetermined service page by using a user terminal 1450 and inputs text with respect to a certain area of the service page, the search unit 1402 searches font information associated with the first user and the certain area with reference to the user database 1401. The service page may be a personal community space such as a blog and a homepage or may be a public community space such as a news board and a community having a plurality of members.

The service page generation unit 1403 updates the service page by using the retrieved font information such that a text image corresponding to the inputted text and generated according to the font information is displayed in the certain area.

The service page providing unit 1404 provides the updated service page to the first user.

According to the described configuration, when users input text with respect to a certain area of a service page, the text is converted into a letter having a font established with respect to the certain area and displayed.

Figure 13:
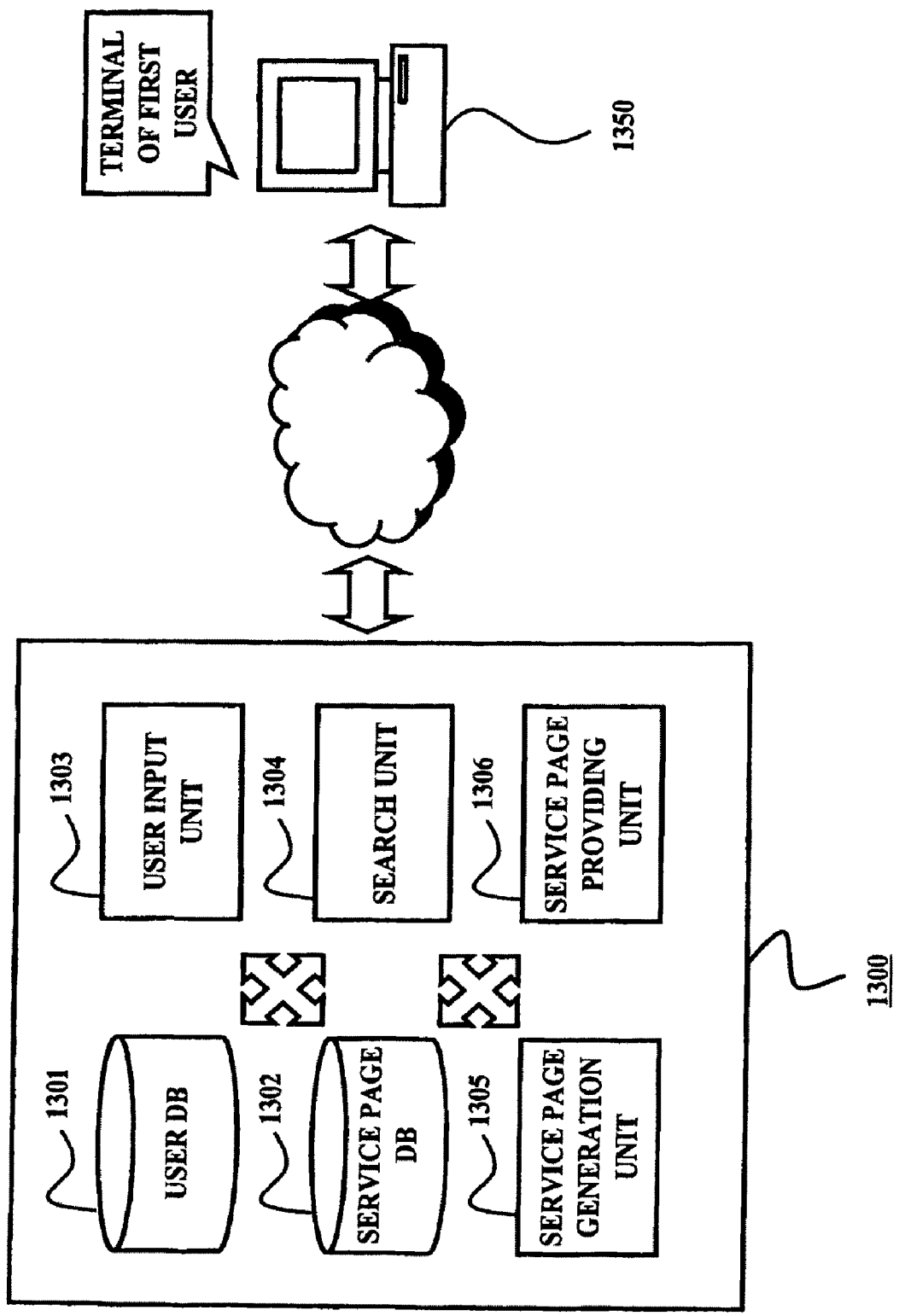
FIG. 13 is a block diagram illustrating a font service providing system according to another embodiment of the present invention.
Figure 14:
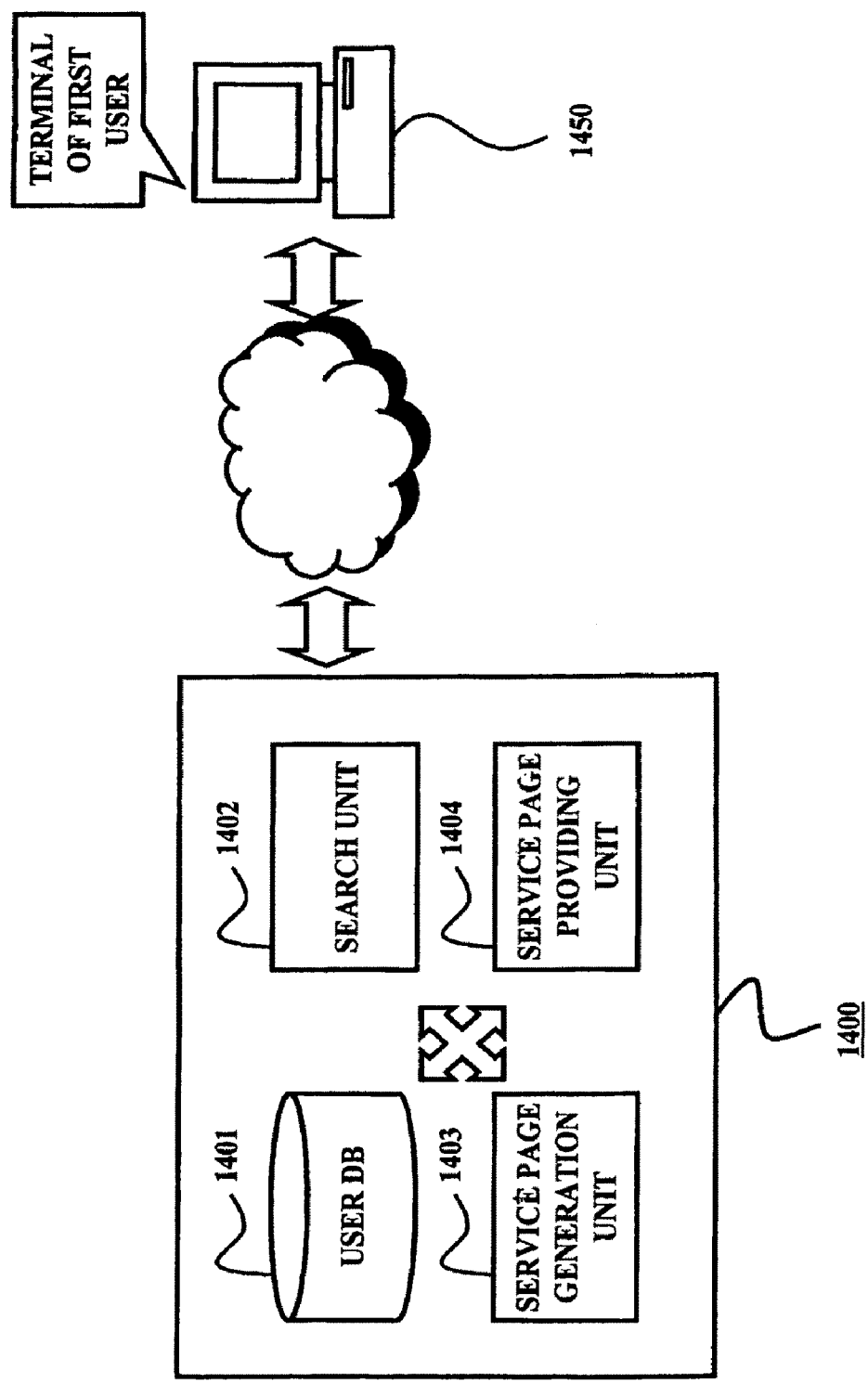
FIG. 14 is a block diagram illustrating a font service providing system according to still another embodiment of the present invention.

On the other hand, though the case in which respective elements of the font service systems 1300 and 1400 are embodied in one apparatus is illustrated in FIGS. 13 and 14, this is nothing but an exemplary example. It is clear to those of ordinary skill in the art that, according to embodiments, respective elements may be individually embodied in a separated apparatus and a communication means for communication between each of the apparatuses may be included for ease of management or dispersion of loads.

Figure 15:
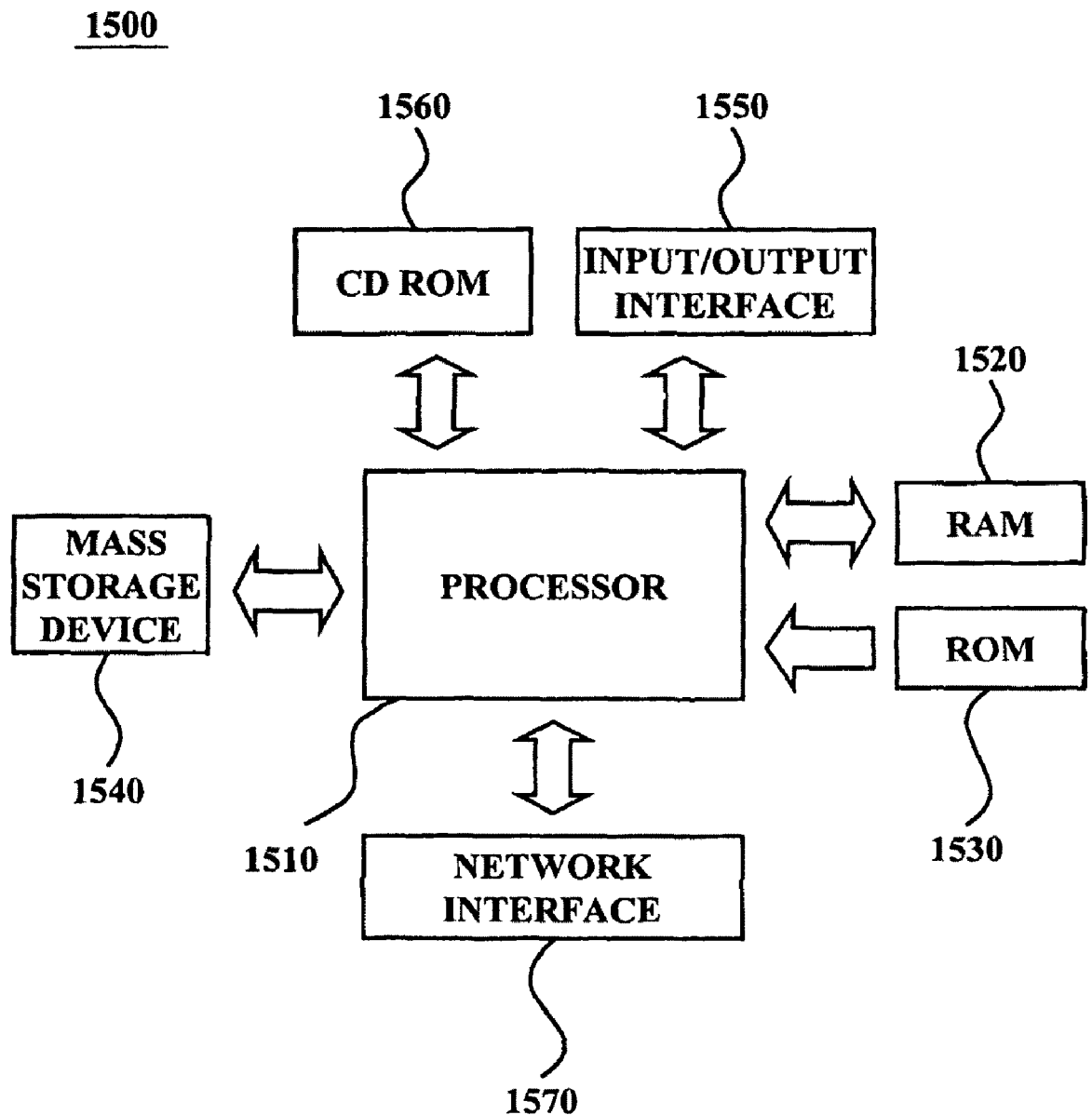
FIG. 15 is an inner block diagram of a general use computer apparatus capable of being employed to perform the font service providing method according to the present invention.

FIG. 15 is an inner block diagram of a general use computer apparatus capable of being employed to perform the font service providing method according to the present invention.

A computer apparatus 1500 includes at least one processor 1510 connected to a main memory device including a RAM (Random Access Memory) 1520 and a ROM (Read Only Memory) 1530. The processor 1510 is also called a central processing unit CPU. As is well-known in the field of the art, the ROM 1530 unidirectionally transmits data and instructions to the CPU, and the RAM 1520 is generally used for bidirectionally transmitting data and instructions. The RAM 1520 and the ROM 1530 may include a certain proper form of a computer readable recording medium. A mass storage device 1540 is bidirectionally connected to the processor 1510 to provide additional data storage capacity and may be one of the computer readable recording medium. The mass storage device 1540 is used for storing programs and data and is an auxiliary memory. A particular mass storage device such as a CD ROM 1560 may be used. The processor 1510 is connected to at least one input/output interface 1550 such as a video monitor, a track ball, a mouse, a keyboard, a microphone, a touch-screen type display, a card reader, a magnetic or paper tape reader, a voice or hand-writing recognizer, a joy stick, and other known computer input/output units. The processor 1510 may be connected to a wired or wireless communication network via a network interface 1570. The procedure of the described method can be performed via the network connection. The described devices and tools are well-known to those skilled in the art of computer hardware and software.

The described hardware devices may be formed to be operated by at least one software module in order to perform the operations of the present invention.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching.

Therefore, it is intended that the scope of the invention be defined by the claims appended hereto and their equivalents.

INDUSTRIAL APPLICABILITY

According to the present invention, there are provided a method of providing font service and a system performing the method, in which a service page is divided into a plurality of areas and a letter font displayed in each area may be established for each area by a user. Accordingly, the user may beautifully decorate a service page associated with the user by using various fonts for each area.

Also, according to the present invention, there are provided a method of providing font service and a system performing the method, in which when a second user that is not a first user having authority with respect to a service page, the first user a so-called master of the service page, inputs text in a certain area of the service page, the text is not displayed as is but converted to a font established by the second user with respect to the certain area. Accordingly, in the case the second user inputs text in a service page of the second user, and the second user accesses a service page of others and inputs text in a certain area, the second user is satisfied with the distinguishing of the second user in a cyberspace since a letter converted to the font established with respect to the certain area by the second user is displayed.

The invention claimed is:

1. A computer-implemented method of providing font services for online services, comprising:
  maintaining font data for at least one specified user in a user database on an item server, the font data including font information and area information associated with the font information, wherein the area information identifies at least one area on a service page, wherein the service page is displayed for providing online services and the font data identifies at least one font for each specified user and at least one area where each font is to be displayed;
  maintaining a service page database on a service server, the service page database including text associated with each area of the service page associated with each specified user; the service server receiving the font data associated with each specified user from the item server;
  generating the service page in which a text image, corresponding to the text associated with a certain area of the service page and generated according to the font information associated with the certain area, is displayed in the certain area, based on the received font data; and providing the generated service page to a user terminal, wherein the item server manages the font data for each specified user to be displayed in each certain area of the service page.

2. A computer-implemented method of providing font services for online services, comprising:

maintaining font data for at least one specified user in a user database on an item server, the font data including font information and area information associated with the font information, wherein the area information identifies at least one area on a service page, wherein the service page is displayed for providing online services and the font data identifies at least one font for each specified user and at least one area where each font is to be displayed;

maintaining a service page database on a service server, the service page database including text associated with each area of the service page associated with each specified user;

in the case a second user requests for accessing a service page associated with a first user, the service server determining whether font data associated with the first user is stored in a user terminal of the second user;

in the case the font data is not stored in the user terminal of the second user, the service server receiving the font data from the item server;

generating the service page on the service server in which a text image, corresponding to the text associated with a certain area of the service page and generated according to the font information associated with the certain area, is displayed in the certain area, based on the received font data; and providing the generated service page to the second user, wherein the item server manages the font data for the first user to be displayed in each certain area of the service page.

3. The method of claim 2, further comprising:

the service server transmitting the font data received from the item server to the user terminal to store the font data in association with the service page in the case the font data is not stored in the user terminal.

4. The method of claim 2, further comprising:

the service server receiving the font data from the user terminal in the case the font data is stored in the user terminal.

5. A computer-implemented method of providing font services for online services, comprising:

maintaining font data for at least one specified user in a user database on an item server, the font data including font information and area information associated with the font information, wherein the area information identifies at least one area on a service page, wherein the service page is displayed for providing online services and the font data identifies at least one font for each specified user and at least one area where each font is to be displayed;

in the case a first user accesses a service page associated with a second user and inputs text with respect to a certain area of the service page, receiving the font information associated with the first user and the certain area from the item server;

the service server generating the service page in which a text image, corresponding to the inputted text and generated according to the font information, is displayed in the certain area by using the received font information; and providing the generated service page to the first user, wherein the item server manages the font data for the first user to be displayed in each certain area of the service page.

6. The method of claim 5, wherein, in the certain area of the service page, authority of inputting contents is distributed to the first user by one of a manager of the service server and the second user.

7. A computer-implemented method of providing font services by using an item server and a service server, comprising:

maintaining font data for at least one specified user in a user database on an item server, the font data including font information and area information associated with the font information, wherein the area information identifies at least one area on a service page, wherein the service page is displayed for providing online services and the font data identifies at least one font for each specified user and at least one area where each font is to be displayed;

in the case a first user accesses a predetermined service page and inputs text with respect to a certain area, the service server receiving font information associated with the first user and the certain area from the item server;

the service server generating the service page in which a text image, corresponding to the inputted text and generated according to the font information, is displayed in the certain area, by using the received font information, and the service server providing the generated service page to the first user, wherein the item server manages the font data for the first user to be displayed in each certain area of the service page.

8. A non-transitory computer readable recording medium in which an executable program is recorded, the executable program, when executed performs the method of claim 1.

9. A system providing font services, comprising:

a storage device a user database stored on the storage device and including font data for at least one specified user in a user database on an item server, the font data including font information and area information associated with the font information, wherein the area information identifies at least one area on a service page, wherein the service page is displayed for providing online services and the font data identifies at least one font for each specified user and at least one area where each font is to be displayed;

a service page database including text associated with respective areas of a service page associated with a user;

a user input unit configured for receiving a request for providing a service page associated with a second user from a first user;

a search unit configured for searching font data associated with the second user from the user database;

a service page generation unit configured for generating the service page in which a text image, corresponding to the certain area of the service page and generated according to the font information associated with the certain area, is displayed in the certain area, based on the searched font data; and a service page providing unit configured for providing the generated service page to the first user, wherein the item server manages the font data for each specified user to be displayed in each certain area of the service page.

10. A system providing font services, comprising:
a storage device
a user database stored on the storage device and including font data for at least one specified user in a user database on an item server, the font data including font information and area information associated with the font information, wherein the area information identifies at least one area on a service page, wherein the service page is displayed for providing online services and the font data identifies at least one font for each specified user and at least one area where each font is to be displayed;
a search unit configured for searching font information associated with a first user and a certain area, based on the user database, in the case the first user accesses a predetermined service page and inputs text associated with the certain area;
a service page generation unit configured for generating the service page in which a text image, corresponding to the certain area of the service page and generated according to the font information associated with the certain area, is displayed in the certain area, by using the searched font information; and
a service page providing unit configured for providing the generated service page to the first user,
wherein the item server manages the font data for each specified user to be displayed in each certain area of the service page.

11. A storage medium encoded with machine-readable computer program code for an executable program, the executable program, when executed, performs the method of claim 2.

12. A storage medium encoded with machine-readable computer program code for an executable program, the executable program, when executed, performs the method of claim 5.

13. A storage medium encoded with machine-readable computer program code for an executable program, the executable program, when executed, performs the method of claim 7.

14. The method of claim 1, wherein the at least one area on the service page identified by the area information is confined to a smaller portion than the whole display area.

15. The method of claim 14, wherein the at least one area on the service page identified by the area information is one of a post, comment and TrackBack.

* * * * *